United States Patent [19]

Kleinschmidt et al.

[11] Patent Number: 4,774,095

[45] Date of Patent: Sep. 27, 1988

[54] FILLING-CONTAINING, DOUGH-BASED PRODUCTS CONTAINING CELLULOSIC FIBRILS AND MICROFIBRILS

[75] Inventors: David C. Kleinschmidt, Wyoming; Bruce A. Roberts, Batavia; Debra L. Fuqua, Cincinnati; Judith R. Melchion, Hamilton, all of Ohio

[73] Assignee: The Procter & Gamble Company, Cincinnati, Ohio

[21] Appl. No.: 942,132

[22] Filed: Dec. 16, 1986

[51] Int. Cl.$^4$ .................... A21D 13/00; A21D 13/08; A23L 1/06

[52] U.S. Cl. ...................................... 426/94; 426/573; 426/579

[58] Field of Search .................... 426/94, 573, 577

[56] References Cited

U.S. PATENT DOCUMENTS

| | | | |
|---|---|---|---|
| 3,656,967 | 4/1972 | Barton et al. | 426/94 X |
| 3,676,151 | 7/1972 | Scharschmidt et al. | 426/94 |
| 3,892,870 | 7/1975 | Wood | 426/573 |
| 4,623,542 | 11/1986 | Wallin et al. | 426/573 X |

OTHER PUBLICATIONS

Desrosier, Elements of Food Technology, 1977, Avi: Westport, Conn., pp. 23-30.

Primary Examiner—Joseph Golian
Attorney, Agent, or Firm—Eric W. Guttag; Rose Ann Dabek; Richard C. Witte

[57] ABSTRACT

Filling-containing, dough-based products, in particular fruit-filled cookies, having good eating quality and flavor release are disclosed. These products comprise a crumb or dough and a low water activity filling associated with this crumb or dough. The filling comprises an aqueous phase having sugar dissolved therein and a thixotropic cohesive network of fibrils and microfibrils dispersed therein. The network of fibrils and microfibrils functions as a flow control agent which permits the filling, and dough forming the crumb, to be co-baked.

16 Claims, 2 Drawing Sheets

FILLING-CONTAINING, DOUGH-BASED PRODUCTS CONTAINING CELLULOSIC FIBRILS AND MICROFIBRILS

TECHNICAL FIELD

This application relates to fillings, in particular filling-containing, dough-based products having good eating quality such as fruit-filled cookies.

Low water activities (i.e., below 0.6) are often needed in baked goods to keep them crisp and crunchy. However, crisp baked goods are often mouth-drying. Fat based creme fillings can be used to provide an additional lubriciousness during eating. An example of such products are sandwich cookies where the creme filling is positioned between two crisp cookie crumbs.

Fat typically comprises about 33% of a creme filling. Replacement of fat with a nonfat ingredients could reduce the calories of such fillings by 15 to 20% on a weight basis. In addition, the display of flavor volatiles from such fillings is usually affected by the presence of the fat. Fillings which do not contain fat can be more suitable for display of flavor volatiles from certain flavor systems.

A prominent example of such nonfat systems are fruit fillings used in "thumb print" type cookies. These thumb print cookies comprise a fruit based material which fills a depression formed in the cookie crumb. Traditional fruit fillings for such cookies are made from fruit preserves or jellies. Unlike creme fillings, the flavor display from these aqueous solutions is controlled by gelling agents such as pectin.

Preserves and jellies used in fruit fillings have a relatively high water activity and a relatively low viscosity. This results in a rapid dispersion of the filling in the mouth when eaten, thus providing a desirable eating quality. However, this can also cause the fruit filling to flow when co-baked with the dough that forms the cookie crumb. The crumb also becomes soft due to the release of liquid from the filling during and after baking.

Starches or gums can be added to preserves or jellies used in fruit fillings for flow control during baking. However, the use of starches or gums as flow control agents creates a filling that is gummy and tacky after baking. This causes the filling to disperse much more slowly in the mouth. The result is reduced eating quality and flavor release in the fruit-filled cookie. Accordingly, it would be desirable to have a flow control agent for fruit fillings which does not reduce the eating quality of the fruit filled cookie after baking.

The crispness of the cookie crumb can be increased by reducing the moisture content of the filling, thus lowering its water activity. However, in the case of preserves or jellies, this typically requires increasing the sugar content which can create a much higher viscosity filling. This relatively high viscosity filling disperses much more slowly in the mouth with a resulting reduced eating quality. In addition, these low moisture, low water activity fillings still need a flow control agent to enable them to be co-baked with the dough. Accordingly, it would be desirable to provide a low water activity fruit filling which also has a relatively low viscosity.

BACKGROUND ART

U.S. Pat. No. 4,341,807 to Turbak et al. (assigned to ITT), issued July 27, 1982, describes food products containing a suspension of microfibrillated cellulose as a thickener, flavor carrier and suspension stabilizer. Food uses specifically taught include fillings, crushes, soups, gravies, puddings, dips, toppings and other food products. See in particular Example 6, which discloses the use of this microfibrillated cellulose in preparing fruit fillings and crushes.

Turbak, "Microfibrillated Cellulose—A New Composition of Commercial Significance," *Tappi,* 1984 *Non-Woven Symposium,* page 121, describes the use of this microfibrillated cellulose in reduced calorie jams and jellies, reduced calorie foods, and low and reduced calorie spreads. This use in low calorie food products appears to be based on microfibrillated cellulose as a nondigestible thickener.

DISCLOSURE OF THE INVENTION

The present invention relates to flavored-fillings having an $a_w$ value of from about 0.2 to about 0.6. The fillings comprise: (1) an aqueous phase; (2) sugar dissolved in the aqueous phase; and (3) from about 0.1 to about 5% by weight of the filling of a thixotropic cohesive network of cellulosic fibrils and microfibrils dispersed in the aqueous phase. The present invention particularly relates to filling-containing, dought-based products such as fruit-filled cookies. These products comprise: (a) a crumb (or dough for forming this crumb) comprising flour, shortening and water; and (b) the flavored filling defined above associated with the crumb or dough.

A key aspect of the present invention is the network of cellulosic fibrils and microfibrils present in the filling. This network of fibrils and microfibrils functions as a flow control agent in the filling. This permits the filling, and the dough forming the crumb, to be co-baked. Even after baking, the filling disperses rapidly in the mouth which results in a good flavor release.

This network of fibrils and microfibrils is especially useful in fillings which optionally contain edible polyol humectants such as glycerol and/or certain edible hydrocolloids such as high methoxy pectins. Use of the polyol humectants provides fillings which have a low water activity and a relatively low viscosity. Use of certain hydrocolloids prevents syneresis, i.e. the physical "squeezing" or release of liquid from the filling during and after baking so that the crumb remains relatively crisp and firm. Because the network of fibrils and microfibrils imparts some stringiness to the filling as it is pulled apart, high methoxy pectins are preferred hydrocolloids since they reduce or prevent such stringiness when processed appropriately, as well as providing an eating quality essentially equivalent to preserves or jellies.

The fillings of the present invention are particularly useful in dough-based products such as fruit-filled cookies. However, if desired, these fillings can also be used in other, nondough-based products which require a filling or jelly-type component. Examples of such products include chocolate enrobed filling products, peanut butter and jelly products, and the like.

A. BRIEF DESCRIPTION OF THE DRAWINGS

B. DEFINITIONS

Figure 1:
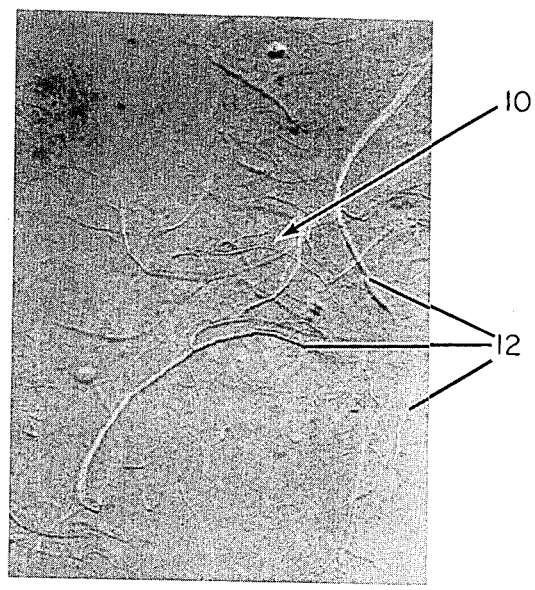
FIG. 1 is a photograph of a portion of a filling made according to the present invention at 500× magnification.

As used herein, the term "dough" refers to a cohesive mass comprising at least flour, shortening and water which has not been baked.

As used herein, the term "crumb" refers to a cohesive mass comprising at least flour, shortening and water which results from dough that has been baked.

As used herein, the term "sugar" refers to a mono- or disaccharide, or a mixture of mono- and/or disaccharides.

"Monosaccharides" and "disaccharides" as used herein are compounds well known in the art. Monosaccharides have the empirical formula $(CH_2O)_n$ where n is equal to or greater than 3. The carbon skeleton of the common monosaccharides is unbranched and each carbon except one bears an —OH group; the remaining carbon is generally combined in an acetal or ketal linkage. Disaccharides consist of two monosaccharides joined by a glycosidic linkage.

By "baking" herein is meant radiant, conductive, or convective exposure to energy of a type which imparts thermal energy to the product being baked. It thus includes conventional, convection, dielectric and microwave oven baking.

The term "water activity" ($a_w$) is used herein in its usual context to mean the ratio of the fugacity of water in the system being studied (f) to the fugacity of pure water ($f_o$) at the same temperature. The water activity of products herein can be measured using well-known physiochemical techniques and commercially available instruments.

As used herein, the term "comprising" means various compatible components can be formulated together. The term "comprising" encompasses the more restrictive terms "consisting essentially of" and "consisting of".

C. FILLING

1. General Description and Sources

Fillings used in the present invention basically comprise an aqueous phase in which are dissolved or dispersed various key components such as sugars and the thixiotropic network of fibrils and microfibrils, as well as optional components such as humectants, hydrocolloids, coloring, preservatives, acidulants (e.g., citric acid), fruit particles (e.g., seeds), etc. An important characteristic of this filling is its water activity ($a_w$ value). The water activity of the filling is determined by its moisture content, as well as various components dissolved or dispersed in the aqueous phase. The fillings of the present invention are generally characterized as having a relatively low water activity, i.e. below about 0.6. For fillings of the present invention, the $a_w$ values can range from about 0.2 to about 0.6. Preferably, the $a_w$ value of the filling is close to that of the dough (or crumb) to avoid the transfer of moisture therebetween.

Another important characteristic of the fillings used in the present invention are their viscosity. The viscosity of the filling is important for eating quality because mouth moistness is inversely proportional to the viscosity. The fillings used in the present invention are generally characterized as having a relatively low viscosity. In this regard, the viscosity of the fillings used in the present invention usually ranges from about 5,000 to about 60,000 centipoise. Preferably, the viscosity of fillings used in the present invention ranges from about 10,000 to about 40,000 centipoise.

The viscosity values of fillings used in the present invention are based on rotational viscometry measurements at 10 seconds$^{-1}$. This particular measurement was chosen as reflecting the shear forces in the mouth to which the filling is subjected during eating. A detailed description of the method for measuring the viscosity of fillings according to the present invention is as follows:

A Rheometrics RFS 8400 fluids spectrometer is used for rotational viscosity measurements. The spectrometer is run in the parallel plate mode using a 25 mm radius plate with a 2.00 mm gap setting in a 25° C. water bath. A steady shear, rate scan from 0.1 to 100 sec$^{-1}$ is also used. Five data points per decade of shear are collected. Each data point is an average of a reading in the clockwise and counterclockwise directions. Data for each reading is collected over a 0.1 min. period and is preceded by a 0.1 min. conditioning period. The reading at 10 sec$^{-1}$ is taken as the viscosity of the filling.

A particularly important component of fillings used in the present invention is sugar. In addition to providing sweetness, sugar controls, to a ceratin extent, the water activity and textural feel of the filling. Suitable sugars for use in fillings of the present invention include sucrose, dextrose, invert sugars, maltose, fructose, high fructose corn syrup and mixtures of these sugars. At low water activities (below about 0.45), sugars such as sucrose tend to crystallize out of solution with a resulting undesirable textural feel. Accordingly, for fillings having relatively low $a_w$ values, fructose and high fructose corn syrup are preferred since these sugars tend not to crystallize out of solution.

The amount of sugar present in fillings used in the present invention depends on a number of factors. A particularly important factor is the water activity of the filling. Generally, as the sugar content is increased, the water activity of the filling is lowered. Usually, sugar comprises from about 20 to about 80% by weight of the filling. Preferably, sugar comprises from about 55 to about 65% by weight of the filling for $a_w$ values closer to about 0.6 and from about 20 to about 50% by weight of the filling for $a_w$ values closer to about 0.2.

The fillings used in the present invention are flavored with either naturally derived or synthetically derived materials. Basically, any suitable water-soluble or dispersible flavor can be used in the fillings of the present invention. These fillings can be non-fruit type, or preferably fruit-type flavors. Suitable non-fruit flavors include mint, barbeque, cheese, pizza, tomato sauce, etc. Suitable fruit flavors include, strawberry, raspberry, blueberry, boysenberry, apple, cherry, grape, orange, bananna, pineapple, Kiwi, mango, etc., The flavoring is present at a flavor-enhancing amount. What will constitute a "flavor-enhancing amount" will depend on the flavoring used, the flavor effects desired and like factors well within the skill of those knowledgeable in the art.

The aqueous, sugar-containing compositions which comprise the fillings of the present invention can be derived from a number of sources. Natural sources of fillings typically provide, in addition to the aqueous sugar-containing composition, a flavoring material. However, suitable fillings can also be obtained by dissolving the appropriate amount of sugar in water and then adding suitable natural or synthetic flavoring(s). Fruit juices and fruit juice concentrates are a preferred source of fruit-fillings for the present invention. Although these juices and juice concentrates naturally contain sugars, additional sugar typically needs to be added. The aqueous sugar-containing compositions used in fruit-fillings of the present invention can also be obtained by boiling down a mixture of fruit and edible humectants.

2. Network of fibrils and microfibrils

In addition to sugar, the aqueous phase of the fillings used in the present invention has dispersed therein a thixotropic cohesive network of cellulosic, substantially water-insoluble fibrils and microfibrils. This network is shown at a magnification of 500× in FIG. 1 and is indicated by numeral 10. At this magnification, only fibrils indicated by numeral 12 are visible. The microfibrils which are present in network 10 are visible only at magnifications much greater than 500×.

Figure 2:
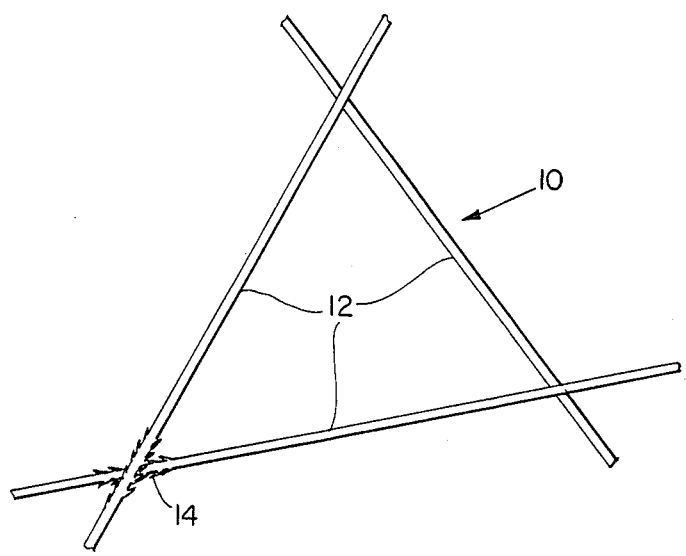
FIG. 2 is a greatly enlarged representation of what a portion of the network of cellulosic fibrils and microfibrils is believed to look like in the fillings of the present invention.

A representation of what a portion of network 10 is believed to look like, at a magnification much greater than 500×, is shown in FIG. 2. The fibrils which comprise this network are again indicated by numeral 12. The fibrils 12 basically constitute the "reinforcing rods" of network 10. The fibrils can vary in length, but are usually within the range of from about 10 to about 1,000 microns. The majority of these fibrils typically have a length of from about 100 to about 250 microns.

Fibrils 12 are comprised of rope-like bundles of microfibrils. The surface of the fibrils usually has exposed microfibrils which are indicated by numeral 14. It is believed that these exposed microfibrils 14 cause fibrils 12 to adhere together to form network 10. (It is believed that this adherence is due to hydrogen bonding between the fibrils and microfibrils.) Although the microfibrils are often still attached to the fibrils, it is believed that, in certain instances, unattached microfibrils can form portions of network 10.

The microfibrils also vary in length, but are generally shorter than the fibrils. Typically, the microfibrils have a length of from about 1 to about 100 microns. Another key difference between the fibrils and microfibrils is their diameter. Fibrils typically have a diameter of from about 0.1 to about 2 microns. By contrast, microfibrils typically have a diameter of from about 0.025 to about 0.1 microns.

This network of fibrils and microfibrils has a relatively large surface area. Generally, the surface area of this network is greater than about 100 m$^2$/g. Typically, the surface area of this network ranges from about 100 to about 170 m$^2$/g. This relatively large surface area appears to be important to the flow control properties of this network in the filling. For example, freeze-drying of the fibrils and microfibrils, which reduces the surface area due to hydrogen bonding, causes the network to be poorly or nonfunctional as a flow control agent in the filling.

The surface area of the fibrils and microfibrils is measured by a Quantasorb instrument (Quantachrome Company, Syosset, N.Y.). This measurement involves a monolayer nitrogen adsorption analysis of a dried sample at three different partial pressures, i.e. a three point B.E.T. analysis. The dried sample is obtained by drying an aqueous suspension of the fibrils and microfibrils with ethanol and acetone, followed by critical point drying with carbon dioxide. See Dawes, *Biological Techniques for Transmission and Scanning Electron Microscopy* (2d. Edition 1979), pp 231–39, which describes techniques for critical point drying of materials.

An important characteristic of this network of fibrils and microfibrils is the fact that it is thixotropic. In the absence of mechanical shear, the fibrils and microfibrils form a cohesive network in the filling. This network imparts a sufficiently high viscosity and yield point to the filling that is not affected at up to baking temperatures, i.e. up to about 100° to about 120° C. As a result, this network prevents flow of the filling during baking, i.e., the network functions as an effective flow control agent.

By contrast, when subjected to even moderate mechanical shear, this network is easily disrupted with a resulting lowering of the viscosity of the filling. In particular, the shear forces generated in the mouth during eating of the filled products of the present invention is sufficient to disrupt this network. The resulting lowering of the yield point of the filling makes it disperse rapidly in the mouth and creates a desirable moistness impression. This rapid mouth dispersion also provides good flavor release from the filling.

The cellulosic fibrils and microfibrils which form the thixotropic cohesive network can be obtained from various sources. A preferred source is microfibrillated cellulose prepared according to the method disclosed in U.S. Pat. No. 4,374,702 to Turbak et al, issued Feb. 22, 1983, which is incorporated by reference. In this method, cellulosic pump or other unregenerated fibrous cellulose is added to a liquid suspending media which swells the cellulose. This liquid suspension is repeatedly passed through a small diameter orifice in which the mixture is subjected to a large pressure drop (at least 3,000 psi) and a high viscosity shearing action, followed by a high viscosity decelerating impact. This converts the cellulosic starting material into a suspension of microfibrillated cellulose. See also U.S. Pat. Nos. 4,481,076 and 4,481,077 to Herrick, issued Nov. 6, 1984, which disclose other methods for obtaining microfibrillated cellulose and which are incorporated by reference. Microfibrillated cellulose can also be obtained commercially from ITT Rayonier, a subsidiary of the assignee of these patents, as a spray dried powder or moist cake which can optionally contain other ingredients such as dextrin, sucrose or sorbitol.

Another method for obtaining cellulosic fibrils and microfibrils useful in the present invention is by bacterial fermentation of a sugar containing solution. Particularly suitable sugar containing solutions include coconut milt (Nata de Coco) or pineapple (Nata de Pina) solutions. A bacteria culture acts on the sugar solution to spin out a mat of cellulosic fibrils and microfibrils. This mat can then be redispersed in the aqueous phase of the filling to form the desired network of fibrils and microfibrils.

The network of cellulosic fibrils and microfibrils is dispersed in the aqueous phase in an amount of from about 0.1 to about 5% by weight of the filling. At least about 0.1% by weight of this network is needed to provide an effective flow control agent for the filling when baked. At levels much above 5% by weight, this network can cause the filling to have too high a viscosity. Preferably, this network is dispersed in the aqueous phase in an amount of from 0.3 to about 2% by weight of the filling.

3. Polyol Humectants

An optional, but preferred component of fillings used in the present invention is an edible polyol humectant. As used herein, the term "edible polyol humectant" refers to a polyol compound, other than a sugar, which is safe for food use, has an affinity for water, and provides a stabilizing action on water present in fillings used in the present invention. Use of polyol humectants permits the fillings of the present invention to have a relatively low water activity without substantially increasing their viscosity. Suitable polyol humectants for use in fillings of the present invention include glycerol, sorbitol, propylene, glycol, and 1,3-butanediol. Sorbitol is a particularly preferred humectant for use in fillings of the present invention.

The edible polyol humectant is dissolved in the aqueous phase in an appropriate amount. The amount of humectant used is primarily dependent on the water activity desired in the filling. For low water activity fillings, higher amounts of humectant are typically included. Generally, the humectant is included in an amount of from about 5 to about 50% by weight of the filling. Preferably, the humectant is included in an amount of from about 10 to about 35% by weight of the filling.

4. Edible Hydrocolloids

Another optional, but preferred component included in fillings used in the present invention are certain edible hydrocolloids. As used herein, the term "edible hydrocolloid" refers to long-chained polymers safe for food use which dissolve or disperse in water to give a thickening or viscosity-producing effect, i.e. gelling. Inclusion of these edible hydrocolloids prevent syneresis of liquid from the filling, especially after baking. This permits the crumb formed from the dough to remain relatively crisp or firm, rather than becoming soft or soggy.

The hydrocolloids which have been found to be useful in the fillings of the present invention are starches, xanthan gum, and high methoxy pectins. The particularly preferred hydrocolloid for inclusion in fillings of the present invention are the high methoxy pectins. Pectins consist chiefly of galacturonic acids which are partially methoxylated and which are joined in long chains having a high molecular weight (M.W.), typically from about 20,000 to about 40,000. Pectins are usually classified by their degree of methoxylation (D.M.). High methoxy pectins used in fillings of the present invention have D.M. values greater than about 50.

The reason high methoxy pectins are preferred for use in fillings of the present invention is to reduce or prevent stringiness. It has been found that the network of cellulosic fibrils and micrfibrils used in fillings of the present invention impart some stringiness to it as it is pulled apart. This is believed to be the result of the fibrils and microfibrils adhering together into long strings due to hydrogen bonding forces under conditions of differential flow. It is believed that pectin gel domains that form in the filling interrupt such differential flow so that long strings of fibrils and microfibrils cannot be formed.

The amount of hydrocolloid used in fillings of the present invention is dependent on various factors, including the particular hydrocolloid used. The amount included should be sufficient to prevent or retard syneresis of liquid from the filling after baking, as well as to optimize eating quality. However, the amount used should not be such that the viscosity of the filling is increased to the point where it substantially affects eating quality. Generally, the hydrocolloid is dissolved or dispersed in the aqueous phase in an amount of from about 0.1 to about 1% by weight of the filling. When high methoxy pectins are used as the hydrocolloid, they are preferably included in an amount of from about 0.2 to about 0.5% by weight of the filling.

The hydrocolloid can be dissolved or dispersed so that the filling has an essentially homogeneous phase. However, when pectin is used, the hydrocolloid is preferably irregularly dispersed throughout the filling as a multiplicity of lumps or domains of pectin gel. When in the form of lumps, the pectin gel is particularly effective in reducing stringiness. These lumps of pectin gel typically have a size ranging from about 0.5 to about 3 mm. and many are sufficiently large so that they can be sensed by the tongue. These lumps give the desirable impression that the filling contains pieces of fruit and provide an eating quality essentially equivalent to preserves or jellies.

D. DOUGH

A major portion of the filling-containing products of the present invention is typically represented by a dough which forms a crumb on baking. This dough comprises at least flour, shortening, and water. Other optional ingredients such as emulsifiers (dough conditioners), leavening agents, corn syrup solids, sweetener, salt, and the like can also be included. Generally, cake (e.g., brownie), cookie and cracker-type doughs which provide, after baking, a low water activity (0.6 or less) crumb can be used in the filling-containing products of the present invention. However, preferred doughs are those which form a cookie-like texture upon baking.

1. Flour

Any type of flour which is suitable in cake, cookie and cracker-type doughs can be used in the present invention. For example, suitable flours include wheat flour, rye flour, corn flour, cottonseed meal, and sorghum flour. Preferably, wheat flour is used in preparing the dough of the present invention. This flour can be bleached or unbleached. Because the flour constitutes a major ingredient of the dough, the percentages of the remaining ingredients are referred to on a flour weight basis (FWB).

2. Shortening

In addition to flour, the dough comprises shortening. Fats which can be used as the shortening component can be any of the usual fat stocks employed in preparing liquid, fluid, plastic, or solid shortenings. Various fats such as cottonseed oil, soybean oil, lard, palm oil, and other vegetable, animal and marine fats, or mixtures thereof, either unhydrogenated or in various stages of hydrogenation, can be used. Suitable shortenings can also be formulated with nonabsorbable, nondigestible fatty acid esters of polyols, in particular surcrose polyesters, disclosed in U.S. Pat. No. 4,005,196 to Jandacek et al., issued Jan. 25, 1977, which is incorporated by reference.

The amount of shortening used in the dough can vary widely depending upon the characteristics desired. Usually, the amount of shortening used is such that the dough of the filling-containing product, when baked, is not excessively tender. Usually, the amount of shortening present in the dough can range from about 30 to about 55% by FWB. Preferably, the amount of shortening ranges from about 40 to about 45% by FWB.

3. Water

In addition to flour and shortening, the dough also contains a suitable amount of water. Generally, the amount of water incorporated in the dough is such that the dough forms a cake-like, cracker-like, or preferably cookie-like, texture when baked. For cracker-type doughs, the amount of water present is such that the $a_w$ value of the baked crumb is typically from about 0.1 to about 0.5, and preferably from about 0.2 to about 0.3. For cookie-type doughs, this $a_w$ value can range from about 0.25 to about 0.8, preferably from about 0.45 to about 0.6. Usually, the amount of water used in the dough ranges from about 20 to about 35% by FWB.

4. Emulsifiers

The dough also desirably includes emulsifiers. These emulsifiers are frequently referred to as "dough conditioners" because they are used to control the consistency of the dough. Suitable emulsifiers include mono- and diglycerides of fatty acids, sucrose partial fatty acid esters, sorbitan esters of fatty acids, polyoxyethylene sorbitan esters of fatty acids, propylene glycol esters, polyethylene glycol esters, ethoxylated mono- and diglycerides, fumarated esters of monoglycerides or their alkali metal salts, alkanoyl lactylates or their metal salts, lecithins, and the like. Preferred dough conditioners include sorbitan monostearate (Span 60), polyoxyethylene sorbitan monostearate (Tween 60), propylene glycol monostearate, glycerol lactopalmitate, sodium stearoyl fumarate, calcium stearoyl-2-lactylate, ethoxylated monoglycerides and lecithin. The amount of emulsifier can be varied to obtain the dough properties desired. These emulsifiers are typically used at from about 0.1 to about 5% by FWB. However, higher or lower amounts can be used if desired.

5. Leavening Agent

The dough also can include a leavening agent. Non-yeast leavening agents include a source of carbon dioxide such as sodium bicarbonate or potassium bicarbonate, alone or in combination with a leavening acid such as monocalcium phosphate, dicalcium phosphate, sodium acid pyrophosphate, sodium aluminum sulfate, sodium aluminum phosphate, potassium acid tartrate and the like. Preferably, an active dry yeast is used as part of the leavening agent for cracker-type doughs. The amount of leavening agent used depends on the particular agent employed and the leavening characteristics desired.

6. Sweetener

Especially for cake and cookie dough systems, a sweetener is typically included. Suitable sweeteners include sucrose, invert sugar syrups, brown sugar, corn syrup solids, fructose, dextrose (glucose), honey, molasses, maple syrup and the like. Particularly preferred sweeteners are sucrose, fructose and corn syrup solids. The amount of sweetener included typically depends upon the type of dough desired (cookie dough, cake dough or cracker dough), as well as the sweetness desired.

7. Optional Ingredients

Other optional ingredients which can be included in the dough are milk products such as whole milk, skim milk, buttermilk, whey, concentrated milk products (condensed or evaporated milk), dried milk products, nonfat milk powder, dry whole milk, modified whole milk and the like, egg products, including egg whites and egg yolks, spices, cocoa products, flavors such as vanilla, salt, color additives, preservatives, antioxidants and the like.

8. Dough Making

The dough can be prepared by standard techniques in the art for making cookie, cake or cracker-type doughs. See Matz et al., *Cookie and Cracker Technology* (2d Ed. AVI Publishing Co., 1978), pp. 166–75, for standard techniques for preparing cracker doughs. Typically, the dry ingredients such as the flour, salt, corn syrup solids, etc. are mixed together. The shortening and emulsifiers are co-melted and the mixed with the dry ingredients. Any yeast, sweetener and water are then mixed in with the mixture of dry ingredients plus shortening-emulsifier to form the finished dough.

Particularly suitable doughs for use in the present invention provide storage-stable, dual-texture cookie crumbs. The "laminated" version of these cookie doughs are disclosed in U.S. Pat. No. 4,455,333 to Hong et al., issued June 19, 1984, which is incorporated by reference. The laminated cookie doughs of Hong et al. combine different doughs to produce a cookie crumb having storage-stable, crisp and chewy textures. This is accomplished by distributing through the crumb-continuous matrix discrete regions of crumb containing readily crystallizable sugar and discrete regions of crumb containing a crystallization-resistant sugar. The result is a storage-stable plurality of textures, the regions containing crystallized sugar providing a crisp texture and the regions containing uncrystallized sugar providing a chewy texture.

In addition, U.S. Pat. No. 4,503,080 to Brabbs et al., issued Mar. 5, 1985, (herein incorporated by reference), discloses a similar storage-stable, dual-textured cookie crumb where the discrete regions of chewy texture contain a readily crystallizable sugar, plus a polyol crystallization inhibitor. U.S. Pat. No. 4,344,969 to Youngquist et al., issued Aug. 17, 1982, (herein incorporated by reference) discloses yet another method for preparing such cookie crumbs from a single-dough where sugar crystallization is controlled by enzyme activity. Manipulation of water activity is one means used for activating and inactivating the enzymes of selected portions of the cookie crumb. Thus, sugar and/or starches in the areas where the enzyme is active are converted into mixtures which are non-crystallizing, or crystallization-resistant, while the crystallization behavior of sucrose is preserved in those areas where the enzyme is inactive. The resulting dough and subsequent crumb areas after baking have storage-stable, crisp and chewy textures, respectively.

The dough for providing these dual-texture cookie crumbs can be made by using any of the methods disclosed in the above Hong et al., Brabbs et al., and Youngquist et al. patents. The preferred cookie doughs are made by the process of preparing a first cookie dough from cookie ingredients containing a crystallization-resistant sugar such as sucrose, or solution thereof, optionally an effective amount of a sugar crystallization inhibitor for the sucrose, preparing a second cookie dough containing sucrose or solution thereof, and substantially enveloping the first dough within a layer of the second dough, thereby forming a ready-to-bake, laminated dough structure, which, when baked yields a dual textured cookie crumb.

Sugar, flour, water and shortening, when combined in almost any reasonable proportions, will produce a dough that can be baked to form a cookie crumb—the classic "sugar cookie". Of course, the sweetness, texture and similar organoleptic properties of the cookie crumb will depend upon the ratio of sugar/flour/water/shortening. In general, any cookie recipe which produces an organoleptically acceptable cookie crumb can be used in the present invention.

E. METHOD FOR MAKING FILLING-CONTAINING PRODUCTS

The filling-containing, dough-based products of the present invention are formed by appropriate combination of the previously described flavored-fillings with a dough. The flavored-filling is formed from an aqueous sugar containing composition, which can optionally contain an edible polyol humectant. In the case of fruit fillings, juice concentrate plus added sugar is a preferred source for such aqueous sugar containing compositions. The cellulosic fibrils and microfibrils are dispersed in this sugar/humectant containing composition at high shear to form the appropriate thixotropic cohesive network. Hydrocolloids such as high methoxy pectins can be optionally dispersed or dissolved before, during or after the fibrils and microfibrils are dispersed in the filling. Alternatively, the sugar/humectant containing composition of cellulosic fibrils and microfibrils can be blended with a second sugar/humectant containing composition which has the hydrocolloid. Once the fibrils and microfibrils, and optional hydrocolloid, are dissolved or dispersed, the filling is then boiled to adjust its water activity to the desired value. After boiling, optional ingredients such as flavors, colors, fruit particles, edible acids, buffers, and the like can then be added. When formed, the filling typically has a pumpable consistency at a temperature from about 75° to about 95° F. (from about 24° to about 35° C.).

In order to form lumps or domains of pectin gel in the filling, a different method from that described above needs to be used. In this method, the pectin is dissolved in an aqueous sugar/humectant composition and then permitted to gel. This gel is then broken up into lumps having the appropriate size. These pectin gel lumps are then gently blended or folded into a viscous sugar/humectant gel containing the cellulosic fibrils and microfibrils. Typically, from about 30 to about 70% by weight pectin gel lumps are blended with from about 70 to about 30% by weight of the fibril/microfibril gel.

This pumpable filling can be used to prepare a variety of filling-containing, dough-based products by standard methods well known in the filled-cookie art. In the case of "thumb print" type cookie products, the dough is formed into appropriate pieces which are then stamped or imprinted with a depression for receiving the filling. The filling is then pumped or added to this depression. The filling of the present invention can also be used to prepare products where the dough partially surrounds the filling. For these products, the filling and dough are typically co-extruded such that the dough encloses the filling. Examples of such products are bar-type cookies of the "Fig Newton"-type.

Once the filling is associated with the dough, this raw product can then be baked to form the finished (baked) filled product. Temperature conditions suitable for forming other baked goods can be used in preparing the baked filled products of the present invention. Typically, the raw filled product is baked at a temperature of from about 275° to about 400° F. (from about 135° to about 204° C.), for from about 5 to about 15 minutes. Preferably, the raw filled product is baked at a temperature of from about 325° to about 375° (from about 163° to about 191° C.), for from about 8 to about 12 minutes. The particular baking conditions employed depend upon the size of the filled product, the amount of doneness desired, the particular oven used, and like factors. If desired, the dough can be baked to form the crumb before the filling is included in the product.

SPECIFIC METHODS FOR MAKING FRUIT-FILLED COOKIE PRODUCTS OF THE PRESENT INVENTION

The following illustrates specific methods for preparing fruit-filled cookie products according to the present invention:

Step 1: Forming Fruit-Filling

EMBODIMENT 1

A fruit filling is prepared by blending together two sugar/humectant containing compositions which have the following ingredients:

| Ingredients | First Composition (g.) | Second Composition (g.) |
|---|---|---|
| Apple juice concentrate | 112 | 112 |
| Fructose (crystalline) | 153 | 153 |
| Sorbitol (crystalline) | 77 | 77 |
| MFC-VG sucrose* | 3.5 | — |
| High methoxy pectin** | — | 0.7 |
| Citric acid | 1.75 | 1.75 |
| Natural strawberry flavor | 2.62 | 2.62 |
| Food color | q.s. | q.s. |
| Total | 349.87 | 347.07 |
| Water Activity | 0.52 | 0.53 |

*Microfibrillated cellulose, ITT Rayonier Forest Products
**Herbstreith NS-2, D.M. of 60–65%.

The MFC-VG (or pectin) are mixed with 60 g. of the fructose and then stirred well. The apple juice concentrate is then added and the resulting composition brought to a boil. The remaining fructose and sorbitol are added and then mixed at the highest speed in an Osterizer mixer for 5 minutes. The citric acid is then added and the resulting composition boiled in a microwave until the $a_w$ value is 0.53 (approximately 4 minutes). The strawberry flavor and food color is then added and thoroughly mixed in. The two resulting compositions are blended together while above the pectin gelation temperature (approximately 170° F. (77° C.)) to form the filling.

EMBODIMENT 2

A fruit filling is prepared from the following ingredients:

| Ingredients | Amount (g) |
|---|---|
| Apple Juice Concentrate | 112 |
| Fructose (crystalline) | 152.4 |
| Sorbitol (crystalline) | 77 |
| MFC-VG sucrose* | 3.5 |
| High Methoxy Pectin** | 0.7 |
| Citric Acid | 1.8 |
| Natural Strawberry Flavor | 2.6 |
| Food Color | q.s. |
| Total | 350.0 |
| Water Activity | 0.53 |

*Microfibrillated cellulose, ITT Rayonier Forest Products
**Herbstreith NS-2, D.M. of 60–65%.

The MFG-VG and pectin are mixed with 60 g. of the fructose and then stirred well. The apple juice concentrate, sorbitol and remaining fructose is then added and the resulting composition brought to a boil in a microwave (approximately 2 minutes). This boiled composition is mixed at the highest speed in the Osterizer mixer for 5 minutes. The citric acid is then added and the resulting composition boiled in a microwave until the $a_w$ value is 0.53 (approximately 3 minutes). The strawberry flavor and food color is then added and mixed in thoroughly to form the filling.

EMBODIMENT 3

A fruit filling is prepared by blending together lumps of pectin gel with a viscous fibril/microfibril gel. These gels are prepared from the following ingredients:

| Ingredients | Fibril/Microfibril Gel | Pectin Gel |
|---|---|---|
| Apple juice concentrate | 112 | 112 |
| Fructose (crystalline) | 149.6 | 151.3 |
| Sorbitol (crystalline) | 77 | 77 |
| MFC-VG sucrose* | 3.5 | — |
| High methoxy pectin** | — | 1.8 |
| Citric acid | 1.8 | 1.8 |
| Natural strawberry flavor | 2.6 | 2.6 |
| Water | 26.2 | 35 |
| Food color | q.s. | q.s. |
| Total | 372.7 | 381.5 |

*Microfibrilated cellulose, ITT Rayonier Forest Products
**Herbstreith NS-2, D.M. of 60-65%.

The fibril/microfibril gel is prepared by adding the fructose, sorbitol, apple juice concentrate and water to a small mixing bowl and then stirring until blended. This blended mixture is heated in a microwave (highest setting) and stirred as follows:

| Heat (min.) | Stir (min.) | Approx. Temp. of Mixture (°F.) | (°C.) |
|---|---|---|---|
| 2 | 0.5 | 130 | 54 |
| 1 | 0.5 | 160 | 71 |
| 1 | 0.5 | 190 | 88 |
| 0.5 | 0.5 | 205 | 96 |
| 0.5 | 0.5 | 217 | 103 |
| 0.5 | 0.5 | 220 | 104 |

The heated mixture is permitted to cool for 7 to 10 min. to a temperature of about 170° to 180° F. (about 77° to 82° C.). About half of this cooled mixture is poured into an Osterizer blender and then the MFG-VG is added. The remaining half of the cooled mixture is added to the blender and then the entire mixture is blended for 5 min. at the highest speed. The blended mixture containing the MGF-VG is poured back into the mixing bowl, heated for 30 sec. in the microwave, stirred for 30 sec., heated for 30 sec. in the microwave and then finally stirred for 30 sec. The citric acid is added to the mixture and stirred well, followed by the food color. The resulting mixture is cooled for about 15 min. to a temperature of about 140° to 150° F. (about 60° to 66° C.) before the strawberry flavor is added. After the flavor is added, the resulting mixture is stirred well and then permitted to set up as a viscous fibril/microfibril gel.

The pectin gel is prepared by blending the sorbitol and pectin in a small mixing bowl. The apple juice concentrate and water are then added to the mixing bowl and stirred well. This stirred mixture is heated in a microwave (highest setting) and stirred as follows:

| Heat (min.) | Stir (min.) | Approx. Temp. of Mixture (°F.) | (°C.) |
|---|---|---|---|
| 2 | 0.5 | 150 | 66 |
| 1 | 0.5 | 190 | 88 |
| 0.5 | 0.5 | 195 | 91 |
| 0.5 | 0.5 | 200 | 93 |

-continued

| Heat (min.) | Stir (min.) | Approx. Temp. of Mixture (°F.) | (°C.) |
|---|---|---|---|
| 0.5 | 0.5 | 200 | 93 |

The fructose is then added to the heated mixture, blended well and then heated and stirred as follows:

| Heat (min.) | Stir (min.) | Approx. Temp. of Mixture (°F.) | (°C.) |
|---|---|---|---|
| 1 | 0.5 | 170 | 77 |
| 0.5 | 0.5 | 186 | 86 |
| 0.5 | 0.5 | 200 | 93 |
| 0.5 | 0.5 | 217 | 103 |

The citric acid and food color are then added and stirred well. The resulting mixture is permitted to cool for about 3 min. before the strawberry flavor is added. After the flavor is added, the resulting mixture is stirred well and then permitted to set up as a pectin gel.

The pectin gel is broken up into small lumps. These pectin gel lumps and fibril/microfibril gel are blended together in a weight ratio of 60:40 at room temperature. The blended gel mixture is then heated in a microwave and stirred as follows:

| Heat (sec.) | Stir (sec.) | Approx. Temp. of Mixture (°F.) | (°C.) |
|---|---|---|---|
| 30 | 30 | 100 | 38 |
| 30 | 30 | 115 | 46 |
| 30 | 30 | 135 | 57 |
| 30 | 30 | 150 | 66 |

After cooling to room temperature, filling is ready for use.

Fruit-fillings according to Embodiments 1, 2 or 3 can also be made where high fructose corn syrup is substituted for crystalline fructose and where glycerol, propylene glycol or 1,3-butanediol is substituted for sorbitol.

Step 2: Forming Cookie Dough

A dual-texture cookie dough is formed from first and second doughs having the following compositions:

| Ingredient | First Dough (g) | Second Dough (g) |
|---|---|---|
| Granulated sugar | 164.2 | 82.1 |
| Crisco ® Shortening | 45.1 | 45.1 |
| Crisco ® Oil | 45.1 | 45.1 |
| High Fructose Corn Syrup | — | 106.6 |
| Whole Egg | 48 | — |
| Water | 15 | 17.5 |
| Egg Yolk | — | 18 |
| Dry Egg White Solids | — | 3 |
| Vanilla Powder | 0.7 | 0.7 |
| Almond Extract | 3.8 | 3.8 |
| Butter Flavor | 0.1 | 0.1 |
| Flour | 156.4 | 156.4 |
| Salt | 1.5 | 1.5 |
| Baking Soda | 0.9 | 0.9 |
| Total | 480.8 | 480.8 |

The first dough is prepared by creaming together the sugar, shortening and oil in a Kitchen Aid mixer set at speed 1 for 1 minute. The whole egg and water are then added and blended for 45 sec. Finally, the vanilla powder, almond extract, butter flavor, flour, salt and baking soda are added and mixed for 1 minute to provide the first dough.

The second dough is prepared by creaming together the sugar, shortening, oil and corn syrup for 1 minute similar to the first dough. The water, egg yolk and egg white solids are then added and blended for 45 seconds. Finally, the vanilla powder, almond extract, butter flavor, flour, salt and baking soda are added and mixed for 1 minute to provide the second dough.

Step 3: Forming and Baking Fruit-Filled Cookie Product

Hand made circular laminates are prepared from the first dough, the second dough and a fruit-filling made according to Embodiments 1, 2, or 3. These laminates are arranged in the following order to obtain raw fruit-filled cookie products:

| Laminate | Amount (g) |
|---|---|
| Top First Dough | 3.0 |
| (center cut out to expose filling) | |
| Fruit-filling | 3.0 |
| Second Dough | 2.8 |
| Bottom First Dough | 3.2 |

The raw fruit-filled cookie products are baked for 10 minutes in a standard deck oven at 350° F. (177° C.) to provide baked fruit-filled cookie products.

What is claimed is:

1. A flavored-filling having an $a_w$ value of from about 0.2 to about 0.6 having a viscosity of from about 5,000 to about 60,000 centipose, which comprises:
   (1) an aqueous phase;
   (2) sugar dissolved in said aqueous phase;
   (3) from about 0.1 to about 5% by weight of said filling of a thixotropic cohesive network of cellulosic fibrils and microfibrils dispersed in said aqueous phase;
   (4) from about 5 to about 50% by weight of an edible polyol humectant dissolved in said aqueous phase and selected from the group consisting of glycerol, sorbitol, propylene glycol and 1, 3 butanediol; and
   (5) from about 0.1 to about 1% by weight of a high methoxy pectin wherein said pectin is in the form of a multiplicity of pectin gel lumps having a size ranging from about 0.5 to about 3 mm, said lumps being irregularly dispersed throughout the filling.

2. The filling of claim 1, wherein said viscosity is from about 10,000 to about 40,000 centipoise.

3. The filling of claim 1, wherein said sugar comprises from about 20 to about 80% by weight of the filling.

4. The filling of claim 3, wherein said sugar is selected from the group consisting of sucrose, dextrose, invert sugars, maltose, fructose, high fructose corn syrup and mixtures thereof.

5. The filling of claim 1, wherein said cohesive network of fibrils and microfibrils comprises from about 0.3 to about 2% by weight of the filling.

6. The filling of claim 5, wherein said cohesive network of fibrils and microfibrils has a surface area of from about 100 to about 170 m$^2$/g.

7. The filling of claim 1, which is fruit-flavored.

8. A filling-containing, dough-based product, which comprises:
   (a) a crumb or dough comprising flour, shortening and water; and
   (b) a flavored-filling having an $a_w$ value of from about 0.2 to about 0.6 associated with said crumb or dough having a viscosity of from about 5,000 to about 60,000 centipose, said filling comprising:
   (1) an aqueous phase;
   (2) sugar dissolved in said aqueous phase;
   (3) from about 0.1 to about 5% by weight of said filling of a thixotropic cohesive network of cellulosic fibrils and microfibrils dispersed in said aqueous phase;
   (4) from about 5 to about 50% by weight of an edible polyol humectant dissolved in said aqueous phase and selected from the group consisting of glycerol, sorbitol, propylene glycol and 1, 3 butanediol; and
   (5) from about 0.1 to about 1% by weight of high methoxy pectin wherein said pectin is in the form of a multiplicity of pectin gel lumps having a size ranging from about 0.5 to about 3 mm, said lumps being irregularly dispersed throughout the filling.

9. The product of claim 8, wherein said viscosity is from about 10,000 to about 40,000 centipoise.

10. The product of claim 8, wherein said sugar comprises from about 20 to about 80% by weight of said filling.

11. The product of claim 10, wherein said sugar is selected from the group consisting of sucrose, dextrose, invert sugars, maltose, fructose, high fructose corn syrup and mixtures thereof.

12. The product of claim 8 wherein said cohesive network of fibrils and microfibrils comprises from about 0.3 to about 2% by weight of said filling.

13. The product of claim 12 wherein said cohesive network of fibrils and microfibrils has a surface area of from about 100 to about 170 m$^2$/g.

14. The product of claim 8, wherein said filling is fruit-flavored.

15. The product of claim 14, wherein said dough or crumb comprises a cookie dough or crumb.

16. The product of claim 15, which has been baked.

* * * * *